US010650686B2

(12) United States Patent
Evans et al.

(10) Patent No.: US 10,650,686 B2
(45) Date of Patent: May 12, 2020

(54) FLIGHT PLAN RECOMMENDATION BASED ON ANALYSIS OF AIRSPACE VOXELS

(71) Applicant: VERIZON PATENT AND LICENSING INC., Basking Ridge, NJ (US)

(72) Inventors: Jonathan Evans, Portland, OR (US); Dana Maher, Portland, OR (US); Tariq Rashid, Jacksonville, FL (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 181 days.

(21) Appl. No.: 15/725,012

(22) Filed: Oct. 4, 2017

(65) Prior Publication Data
US 2019/0103031 A1    Apr. 4, 2019

(51) Int. Cl.
*G05D 1/00* (2006.01)
*G08G 5/00* (2006.01)

(52) U.S. Cl.
CPC ......... *G08G 5/0069* (2013.01); *G05D 1/0011* (2013.01); *G08G 5/006* (2013.01); *G08G 5/0013* (2013.01); *G08G 5/0026* (2013.01); *G08G 5/0034* (2013.01); *G08G 5/0039* (2013.01); *G08G 5/0043* (2013.01); *G08G 5/0091* (2013.01)

(58) Field of Classification Search
CPC .. G08G 5/0069; G08G 5/0034; G08G 5/0039; G08G 5/006; G05D 1/0011
See application file for complete search history.

(56) References Cited

U.S. PATENT DOCUMENTS

| 6,085,147 | A | * | 7/2000 | Myers | G01C 21/3453 |
| | | | | | 342/33 |
| 6,201,482 | B1 | * | 3/2001 | Schiefele | G08G 5/006 |
| | | | | | 340/961 |
| 2007/0299611 | A1 | * | 12/2007 | Winkler | G01C 23/005 |
| | | | | | 701/301 |
| 2009/0177343 | A1 | * | 7/2009 | Bunch | G01S 7/22 |
| | | | | | 701/14 |
| 2010/0194628 | A1 | * | 8/2010 | Christianson | G01S 7/18 |
| | | | | | 342/26 B |
| 2010/0201565 | A1 | * | 8/2010 | Khatwa | G01S 7/062 |
| | | | | | 342/26 B |
| 2013/0332059 | A1 | * | 12/2013 | del Pozo de Poza | ........ |
| | | | | | G06Q 10/047 |
| | | | | | 701/123 |

(Continued)

*Primary Examiner* — Stephen Holwerda (57) ABSTRACT

A device can receive information that identifies an airspace voxel that represents a three-dimensional portion of airspace during a particular time period. The device can associate one or more airspace parameters with the airspace voxel. The one or more airspace parameters can represent one or more conditions that relate to flight through the airspace voxel during the particular time period. The device can receive one or more flight parameters regarding a potential flight plan of an aircraft through a plurality of airspace voxels, including the airspace voxel, during the particular time period. The device can analyze the one or more flight parameters and a plurality of airspace parameters, associated with the plurality of airspace voxels, using one or more airspace rules. The device can output a recommendation regarding the potential flight plan based on analyzing the one or more flight parameters and the plurality of airspace parameters.

20 Claims, 6 Drawing Sheets

(56) References Cited

U.S. PATENT DOCUMENTS

2016/0011741 A1\* 1/2016 Khatwa ............... G06F 3/04817
715/765
2016/0210863 A1\* 7/2016 Kohn-Rich .......... G05D 1/0646

\* cited by examiner

FLIGHT PLAN RECOMMENDATION BASED ON ANALYSIS OF AIRSPACE VOXELS

BACKGROUND

An unmanned aerial vehicle (UAV), commonly known as a drone, is an aircraft without a human pilot aboard. The flight of UAVs can operate with various degrees of autonomy (e.g., under remote control by a human operator, autonomously by onboard computers, etc.). UAVs can be used for a variety of purposes including logistics (e.g., delivering cargo), aerial photography, data collection, combat, and reconnaissance.

DETAILED DESCRIPTION OF PREFERRED EMBODIMENTS

The following detailed description of example implementations refers to the accompanying drawings. The same reference numbers in different drawings may identify the same or similar elements.

As the use of unmanned aerial vehicles (UAVs) increases, managing airspace for the flight of UAVs will become increasingly complex. For example, a UAV flight plan must account for a large number of changing conditions, such as regulatory conditions, flight plans of other UAVs and manned aerial vehicles, weather and other environmental conditions, as well as characteristics of different UAVs. As such, management of UAV flights can require the analysis of hundreds, thousands, millions, billions or more data points, particularly as hundreds, thousands, or more UAVs are deployed.

Implementations described herein can divide airspace into airspace voxels that each represent a three-dimensional portion of airspace during a particular time period. This can result in the creation of thousands, millions, or more voxels. An airspace voxel can be associated with airspace parameters that represent conditions relating to flight through the airspace voxel during a particular time period. These airspace voxels and associated airspace parameters can be used to analyze and provide recommendations regarding flight plans for tens, hundreds, thousands, millions, or more UAVs to consistently generate safe, efficient flight plans. Such flight plans can be analyzed before a UAV flight (e.g., pre-flight), or can be generated in real-time via direct communication with the UAV while the UAV is in flight. In this way, a large quantity of UAV flight plans can be improved or optimized to increase flight safety, reduce accidents, conserve UAV energy (e.g., battery power, fuel, etc.), reduce flight time, and/or the like.

Figure 1A:
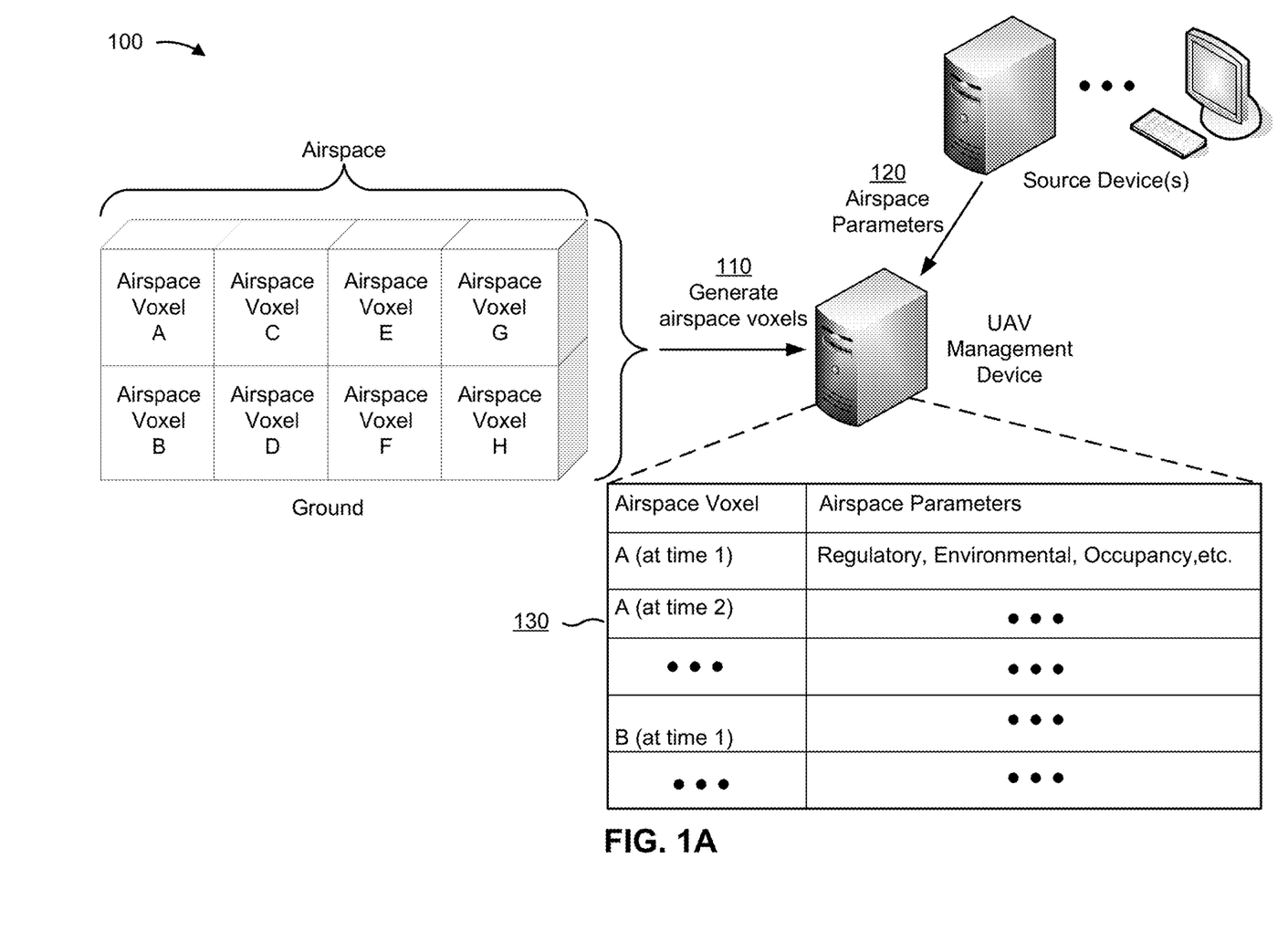
FIGS. 1A-1C are diagrams of an overview of an example implementation described herein.
Figure 1B:
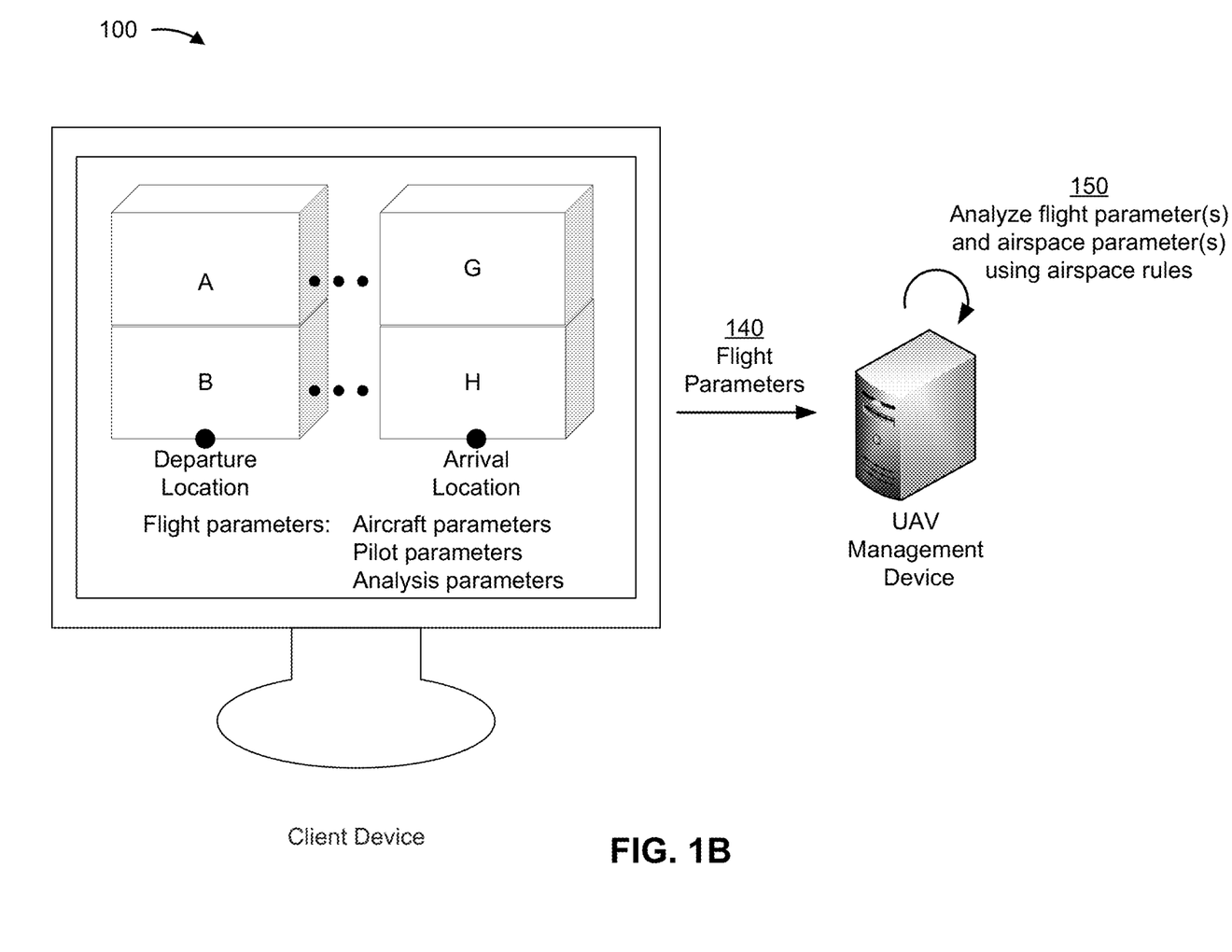
Figure 1C:
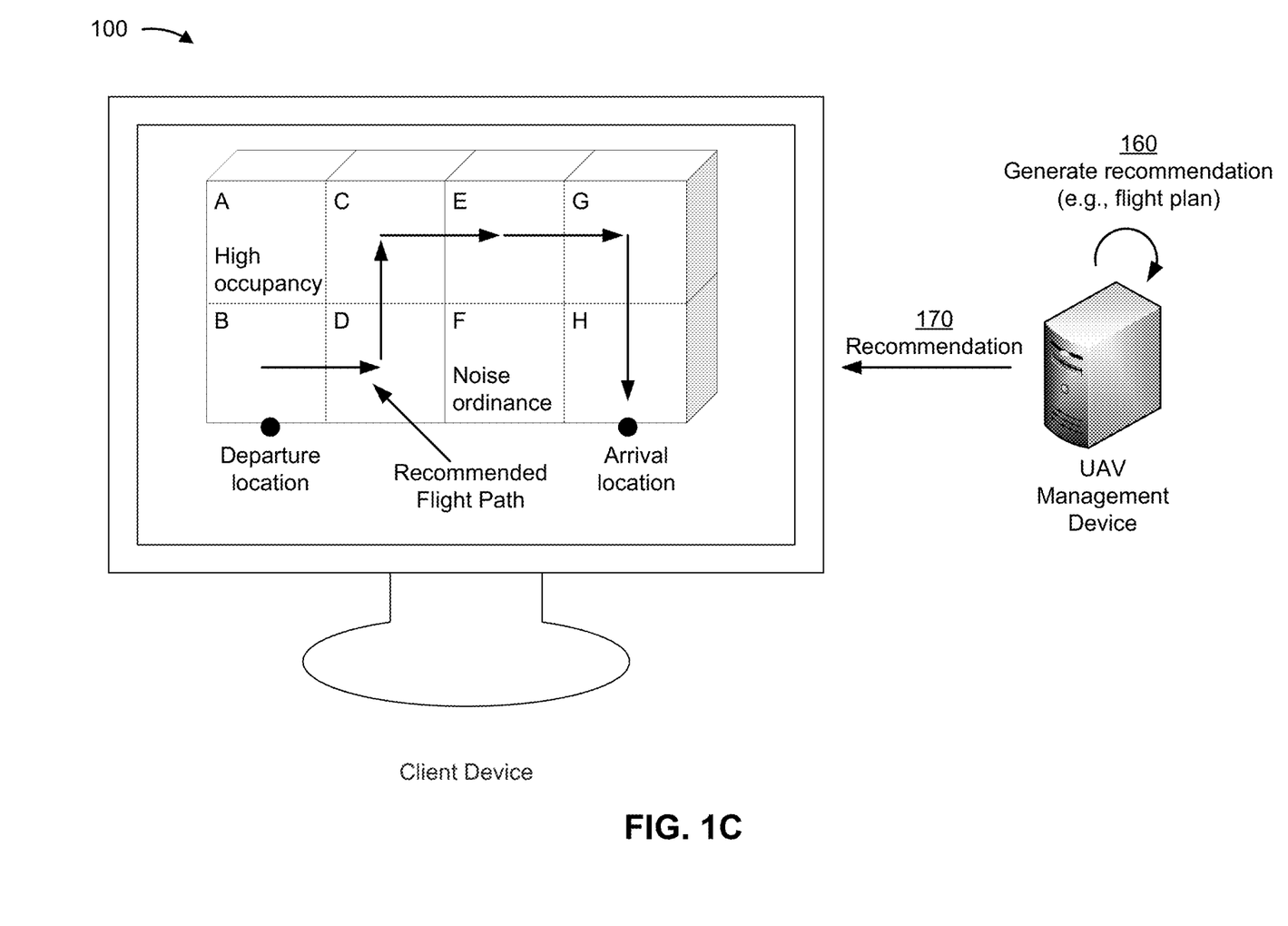

FIGS. 1A-1C are diagrams of an overview of an example implementation 100 described herein. As shown in FIG. 1A, example implementation 100 can include a UAV management device and one or more source devices. As shown by reference number 110, the UAV management device can generate airspace voxels. Each airspace voxel can represent a three-dimensional portion of airspace during a particular time period (e.g., 1 second, 10 seconds, 30 seconds, 1 minute, 5 minutes, etc.). In some implementations, the UAV management device can generate the voxels. Additionally, or alternatively, the UAV management device can receive information identifying the voxels from another device.

As further shown in FIG. 1A, and by reference number 120, the UAV management device can receive airspace parameters from one or more source devices (e.g., servers, end user computers, etc.). An airspace parameter can represent a condition relating to flight through a voxel (e.g., during a particular time period), such as a regulatory condition (e.g., a flight restriction, a zoning law, a noise ordinance, a privacy ordinance, etc.), an environment condition (e.g., weather, sunlight, time of day, etc.), a voxel occupancy condition (e.g., whether another aircraft will be located in the voxel during a time period, a quantity of aircraft that will be located in the voxel during the time period, a size, weight, or class of those aircraft, etc.), and/or the like. Additional details regarding these conditions are described elsewhere herein.

As further shown in FIG. 1A, and by reference number 130, the UAV management device can store a data structure that associates voxels and airspace parameters. For example, airspace voxel A (at time 1) can be associated with a first set of one or more airspace parameters, airspace voxel A (at time 2) can be associated with a second set of one or more airspace parameters, etc., airspace voxel B (at time 1) can be associated with an $n^{th}$ set of one or more airspace parameters, and so on. The data structure can include a massive amount of data (e.g., big data), which the UAV management device can use to analyze UAV flight plans, as described below.

As shown in FIG. 1B, example implementation 100 can further include a client device. As shown by reference number 140, the UAV management device can receive one or more flight parameters from the client device. For example, a user can interact with the client device to request a flight plan for a UAV, and the flight plan can include, for example, a departure location and an arrival location, as well as flight parameters.

The flight parameters can include aircraft parameters (e.g., a size, weight, or class of the UAV, an airworthiness of the UAV, a payload of the UAV, an amount of noise generated by the UAV, etc.), pilot parameters (e.g., a type of license that the UAV pilot has, an experience level of the UAV pilot, qualifications of the UAV pilot, etc.), analysis parameters (e.g., a risk, cost, time, or network tolerance associated with the flight plan), and/or the like. Additional details regarding flight plans and flight parameters are described elsewhere herein.

As further shown in FIG. 1B, and by reference number 150, the UAV management device can analyze the flight parameters and airspace parameters using airspace rules. The airspace rules can be global rules that apply to all aircraft (e.g., government regulations), individual UAV rules that apply to a particular UAV, group UAV rules that apply to a group of UAVs (e.g., UAVs owned by the same owner, UAVs that are the same class, etc.), pilot rules that apply to a particular pilot or a particular type of pilot license, and/or the like. Additional details regarding airspace rules are described elsewhere herein.

As shown in FIG. 1C, and by reference number 160, the UAV management device can generate a recommendation based on the analysis described above. The recommendation can include, for example, a recommended flight plan for a UAV (as shown), a rejection of a proposed flight plan, an approval of a proposed flight plan, or the like. Additionally, or alternatively, the recommendation can include a request for user input to reject or approve the flight plan (e.g., and the UAV management device can provide the user input to a machine learning algorithm to automate such decisions in the future), and/or the like.

As further shown in FIG. 1C, and by reference number 170, the UAV management device can provide the recommendation to the client device. For example, as shown, the recommendation can include a recommended flight plan from the departure location (at voxel B) to the arrival location (at voxel H). In this case, the recommended flight plan can provide information to instruct and/or control the UAV to depart from voxel B, and then to proceed to voxel D rather than voxel A because voxel A has a high occupancy. Continuing with the example, the recommended flight plan can provide information to instruct and/or control the UAV to avoid voxel F (e.g., to prevent violation of a noise ordinance associated with voxel F), and to proceed from voxel D to voxel C to voxel E to voxel G to the arrival location at voxel H.

The above flight plan description is provided merely as an example, and other examples can differ from what was described. In practice, the UAV management device can analyze a large quantity (e.g., hundreds, thousands, millions, etc.) of data points for a large quantity of UAVs to generate recommended flight plans for one or more UAVs. Furthermore, the UAV management device can perform the analysis in real-time as data is received from a UAV during flight of the UAV (e.g., in-flight), such as to alter a flight plan due to changing conditions. In this way, the UAV management device can increase flight safety, reduce accidents, conserve UAV energy, reduce flight time, and/or the like.

As indicated above, FIGS. 1A-1C are provided merely as an example. Other examples are possible and can differ from what was described with regard to FIGS. 1A-1C.

Figure 2:
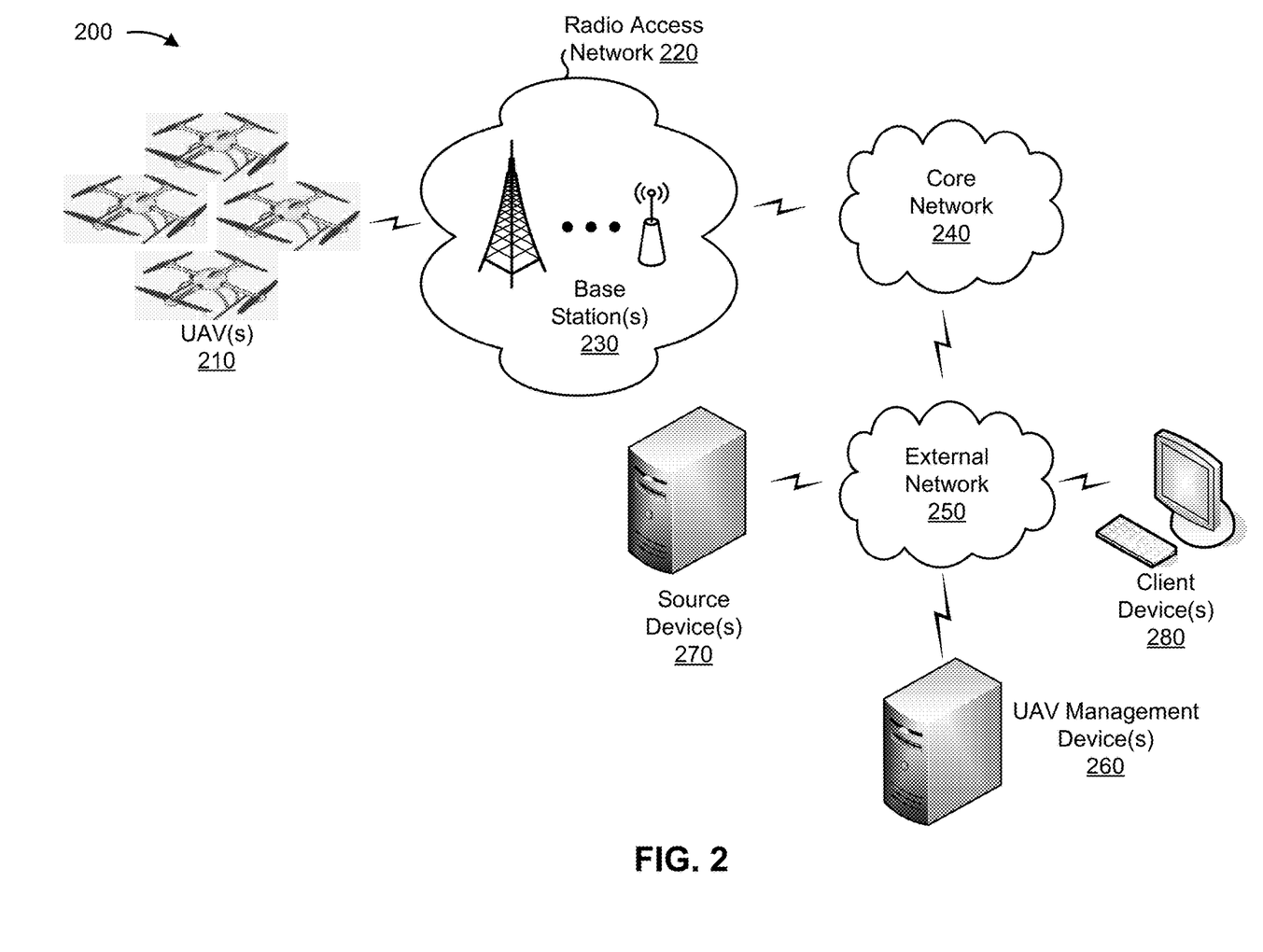
FIG. 2 is a diagram of an example environment in which systems and/or methods, described herein, can be implemented.

FIG. 2 is a diagram of an example environment 200 in which systems and/or methods, described herein, can be implemented. As shown in FIG. 2, environment 200 can include one or more unmanned aerial vehicles (UAVs) 210 (hereinafter referred to individually as "UAV 210," and collectively as "UAVs 210"), a radio access network (RAN) 220, one or more base stations 230 (hereinafter referred to individually as "base station 230," and collectively as "base stations 230"), a core network 240, an external network 250, a UAV management device 260, one or more source devices 270, and one or more client devices 280. Devices of environment 200 can interconnect via wired connections, wireless connections, or a combination of wired and wireless connections.

UAV 210 includes an aircraft without a human pilot aboard, and can also be referred to as an unmanned aircraft (UA), a drone, a remotely piloted vehicle (RPV), a remotely piloted aircraft (RPA), or a remotely operated aircraft (ROA). UAV 210 can have a variety of shapes, sizes, configurations, characteristics, etc. for a variety of purposes and applications. In some implementations, UAV 210 can include one or more sensors, such as an electromagnetic spectrum sensor (e.g., visual spectrum, infrared, or near infrared cameras, radar systems, etc.), a biological sensor, a temperature sensor, a chemical sensor, and/or the like. In some implementations, UAV 210 can include one or more components for communicating with base station(s) 230. Additionally, or alternatively, UAV 210 can transmit information to and/or can receive information from UAV management device 260, such as sensor data, flight plan information, and/or the like. Such information can be communicated via base station 230, core network 240, and/or external network 250.

RAN 220 includes one or more radio access networks such as, for example, a code division multiple access (CDMA) RAN, a time division multiple access (TDMA) RAN, a frequency division multiple access (FDMA) RAN, a universal terrestrial radio access network (UTRAN), an evolved UTRAN (E-UTRAN) (e.g., an LTE RAN, an LTE-Advanced (LTE-A) RAN, an LTE-unlicensed (LTE-U) RAN, etc.), or the like. RAN 220 can include one or more base stations 230 that provide access for UAVs 210 to core network 240.

Base station 230 includes one or more devices capable of transferring traffic, such as audio, video, text, and/or other traffic, destined for and/or received from UAV 210. In some implementations, base station 230 can include an evolved NodeB (eNB) associated with an LTE radio access network (RAN) that receives traffic from and/or sends traffic to UAV management device 260 and/or client device 280 via core network 240. Additionally, or alternatively, one or more base stations 230 can be associated with a RAN that is not associated with the LTE network. Base station 230 can send traffic to and/or receive traffic from UAV 210 via an air interface. Base station(s) 230 can include different types of base stations, such as a macro cell base station or a small cell base station, such as a micro cell base station, a pico cell base station, and/or a femto cell base station. A macro cell base station can cover a relatively large geographic area (e.g., several kilometers in radius). A small cell base station can be a lower-powered base station, as compared with a macro cell base station that can operate in the same or different (e.g., licensed, unlicensed, etc.) frequency bands as macro cell base stations.

Core network 240 includes a network that enables communications between RAN 220 (e.g., base station(s) 230) and one or more devices and/or networks connected to core network 240. For example, core network 240 can include an evolved packet core (EPC). Core network 240 can include one or more mobility management entities (MMEs), one or more serving gateways (SGWs), and one or more packet data network gateways (PGWs) that together provide mobility functions for UAVs 210 and enable UAVs 210 to communicate with other devices of environment 200.

External network 250 includes one or more wired and/or wireless networks. For example, external network 250 can include a cellular network (e.g., a long-term evolution (LTE) network, a code division multiple access (CDMA) network, a 3G network, a 4G network, a 5G network, another type of advanced generated network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

UAV management device 260 includes one or more devices for managing UAVs 210 and/or flight plans for UAVs 210. For example, UAV management device 260 can include a server, a desktop computer, a laptop computer, or a similar device. In some implementations, UAV management device 260 can communicate with one or more devices of environment 200 (e.g., UAV 210, source device 270, client device 280, etc.), and to receive information to be used to analyze and/or recommend flight plans for UAVs 210, and/or to provide a recommendation. In some implementations, UAV management device 260 can permit control of UAV(s) 210 by a user who interacts with client device 280 to access UAV management device 260. In some implementations, UAV management device 260 can be included in a data center, a cloud computing environment, a server farm, or the like, which can include multiple UAV management devices 260. While shown as external from core network 240, in some implementations, UAV management device 260 can reside within core network 240.

Source device 270 includes one or more devices that act as data sources for information to be used by UAV management device 260 to analyze and/or recommend a flight plan. For example, source device 270 can include a server (e.g., in a data center, a cloud computing environment, etc.) and/or a similar type of device. In some implementations, source device 270 can store regulatory information, weather information, flight plan information, and/or the like.

Client device 280 includes one or more devices capable of providing information to be used by UAV management device 260 to analyze and/or recommend a flight plan. For example, client device 280 can include a desktop computer, a laptop computer, a tablet computer, a mobile phone, or a similar device. In some implementations, a user can interact with client device 280 to request a flight plan analysis and/or recommendation for a UAV 210 from UAV management device 260. UAV management device 260 can perform the analysis, and can provide the recommendation to client device 280.

The number and arrangement of devices and networks shown in FIG. 2 are provided as an example. In practice, there can be additional devices and/or networks, fewer devices and/or networks, different devices and/or networks, or differently arranged devices and/or networks than those shown in FIG. 2. Furthermore, two or more devices shown in FIG. 2 can be implemented within a single device, or a single device shown in FIG. 2 can be implemented as multiple, distributed devices. Additionally, or alternatively, a set of devices (e.g., one or more devices) of environment 200 can perform one or more functions described as being performed by another set of devices of environment 200.

Figure 3:
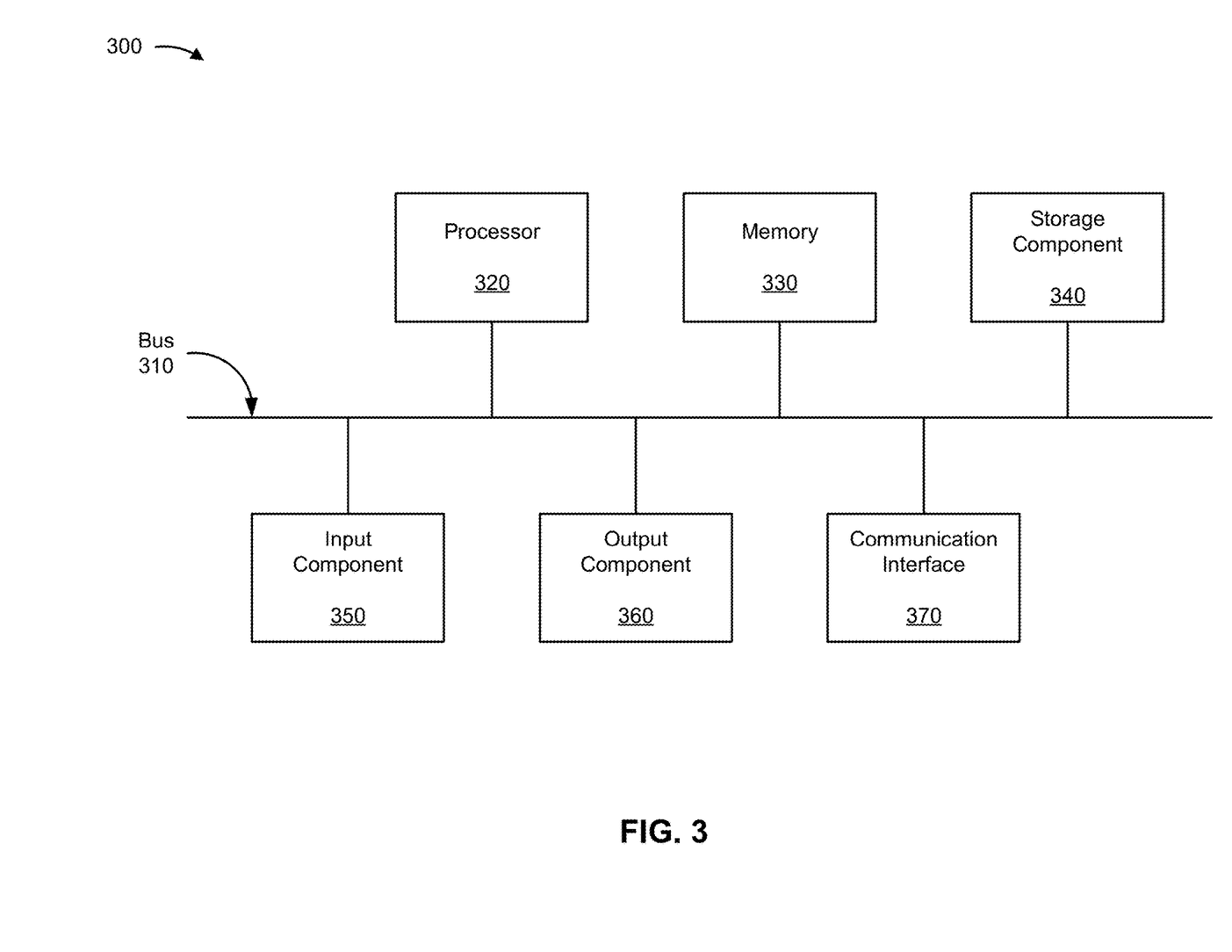
FIG. 3 is a diagram of example components of one or more devices of FIG. 2.

FIG. 3 is a diagram of example components of a device 300. Device 300 can correspond to UAV 210, base station 230, UAV management device 260, source device 270, and/or client device 280. In some implementations, UAV 210, base station 230, UAV management device 260, source device 270, and/or client device 280 can include one or more devices 300 and/or one or more components of device 300. As shown in FIG. 3, device 300 can include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor, a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 can include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 can include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 can permit device 300 to receive information from another device and/or provide information to another device. For example, communication interface 370 can include an Ethernet interface, an optical interface, a coaxial interface, an infrared interface, a radio frequency (RF) interface, a universal serial bus (USB) interface, a Wi-Fi interface, a cellular network interface, or the like.

Device 300 can perform one or more processes described herein. Device 300 can perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions can be read into memory 330 and/or storage component 340 from another computer-readable medium or from another device via communication interface 370. When executed, software instructions stored in memory 330 and/or storage component 340 can cause processor 320 to perform one or more processes described herein. Additionally, or alternatively, hardwired circuitry can be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 can include additional components, fewer components, different components, or differently arranged components than those shown in FIG. 3. Additionally, or alternatively, a set of components (e.g., one or more components) of device 300 can perform one or more functions described as being performed by another set of components of device 300.

Figure 4:
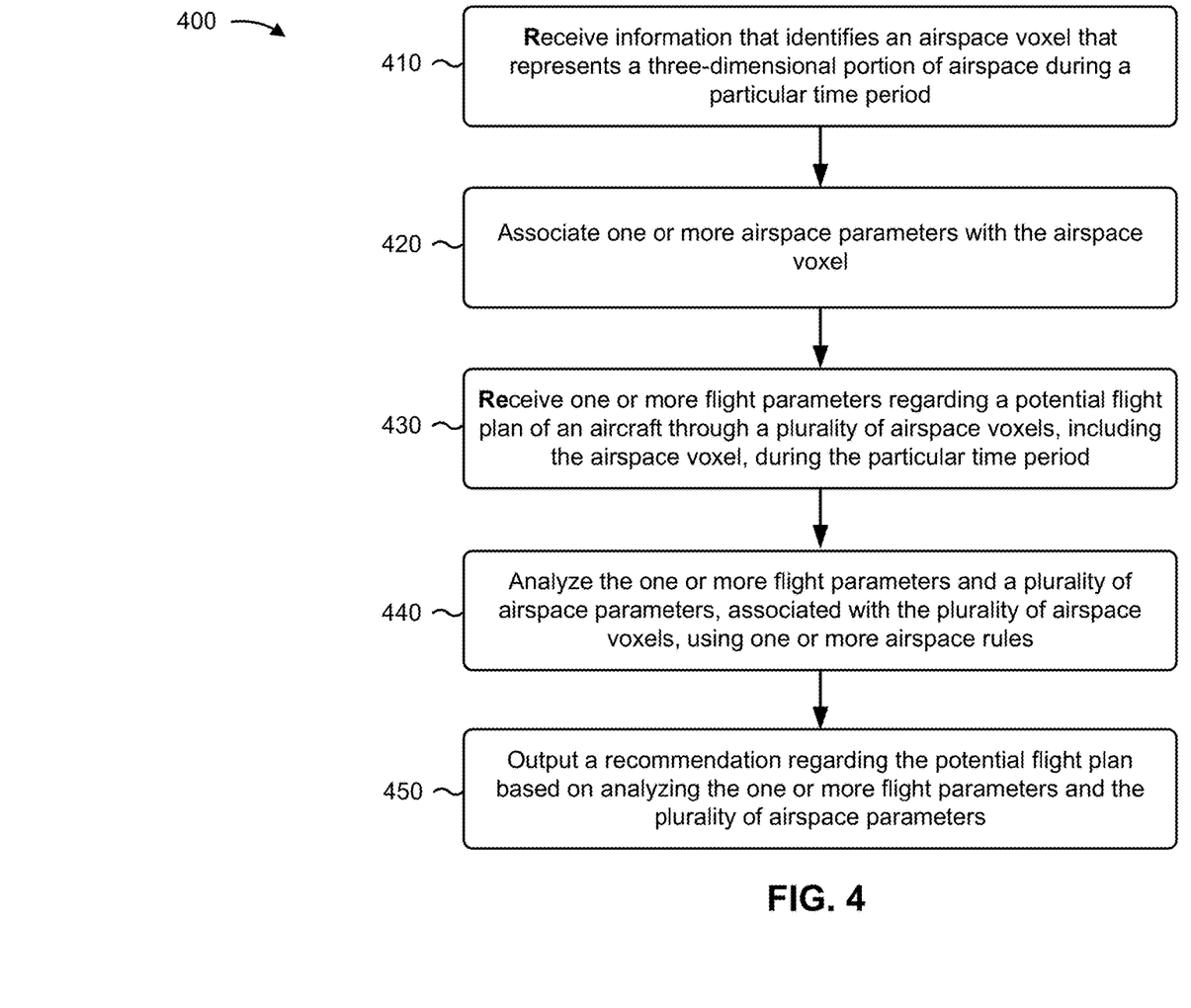
FIG. 4 is a flow chart of an example process for flight plan recommendation based on analysis of airspace voxels.

FIG. 4 is a flow chart of an example process 400 for flight plan recommendation based on analysis of airspace voxels. In some implementations, one or more process blocks of FIG. 4 can be performed by UAV management device 260. In some implementations, one or more process blocks of FIG. 4 can be performed by another device or a group of devices separate from or including UAV management device 260, such as UAV 210, base station 230, source device 270, and/or client device 280.

As shown in FIG. 4, process 400 can include receiving information that identifies an airspace voxel that represents a three-dimensional portion of airspace during a particular time period (block 410). For example, UAV management device 260 can receive the information that identifies an airspace voxel.

In some implementations, an airspace voxel can represent a three-dimensional portion of airspace. In some implementations, the airspace voxel can be associated with a particular time period. In this way, the same three-dimensional portion of airspace can be associated with different parameters at different times, as conditions in the airspace change. In some implementations, a time period can have different granularities, such as an indefinite period, one or more days, one or more hours, one or more minutes, one or more seconds, or the like.

In some implementations, UAV management device 260 can divide airspace into numerous (thousands, millions, etc.) airspace voxels. In some implementations, the airspace voxels can be uniform or non-uniform in size and shape. In some implementations, UAV management device 260 can represent each of the airspace voxels using a group of coordinates (e.g., latitude, longitude, elevation) that define the dimensions of each airspace voxel. In some implementations, UAV management device 260 can receive voxels as input (e.g., user input), or can generate voxels, and can store a representation of voxels (e.g., in a data structure). Additionally, or alternatively, different UAV management devices 260 can manage UAV traffic at different scales, such as a global voxel scale to manage long-distance flights, a regional voxel scale to manage flights within a particular geographic region, a city-wide scale to manage urban flights, and/or the like. In some implementations, the number of voxels managed by UAV management device 260 can vary based on the size of a voxel, a scale of the UAV network managed by the UAV management device 260, and/or the like.

As further shown in FIG. 4, process 400 can include associating one or more airspace parameters with the airspace voxel (block 420). For example, UAV management device 260 can associate the one or more airspace parameters with the airspace voxel.

In some implementations, an airspace parameter can represent one or more conditions that relate to flight through the airspace voxel. In some cases, an airspace parameter can be a static parameter that is valid for all time periods, such as a permanent flight restriction over important government buildings (e.g., The White House). In some cases, an airspace parameter can be dynamic, and can have different values during different time periods, such as a noise ordinance that is valid only at night.

In some implementations, UAV management device 260 can receive airspace parameters as input (e.g., user input), can receive or retrieve the airspace parameters from one or more source devices 270 (e.g., a database of regulatory conditions, etc.), and/or the like. In some implementations, UAV management device 260 can associate airspace parameters with airspace voxels and/or time periods by storing, in a data structure, an indication of a relationship between the airspace parameters, airspace voxels, and/or time periods.

In some implementations, an airspace parameter can represent one or more conditions that include one or more regulatory conditions (e.g., government regulations regarding flight). For example, a regulatory condition can include a flight restriction in an airspace voxel. In this case, the regulatory condition can include a permanent flight restriction (e.g., a class of controlled airspace or uncontrolled airspace), can include a temporary flight restriction (e.g., due to a fire, a police investigation, travel of important government officials, etc.), and/or the like.

As another example, a regulatory condition can include a zoning law associated with an airspace voxel (e.g., whether the ground beneath a voxel is valid for takeoff/landing). As yet another example, a regulatory condition can include a noise ordinance associated with an airspace voxel (e.g., an amount of noise permitted in the voxel or ground beneath the voxel). As still another example, a regulatory condition can include a privacy ordinance associated with an airspace voxel (e.g., a restriction on surveillance).

In some implementations, an airspace parameter can represent one or more conditions that include one or more environmental conditions. For example, an environmental condition can include weather in an airspace voxel (e.g., wind, rain, snow, sleet, hail, fog, clouds, sun, temperature, humidity, barometric pressure, etc.). In this case, the environmental condition can be based on a weather forecast for the airspace voxel, can be based on sensor data gathered from one or more sensors of one or more UAVs 210, or the like. Additionally, or alternatively, an environmental condition can include an amount of sunlight (e.g., which can impact collision detection), a time of day (e.g., which can impact an amount of sunlight, temperature, or other conditions), or the like.

In some implementations, an airspace parameter can represent one or more conditions that include one or more voxel occupancy conditions. For example, a voxel occupancy condition can identify whether another aircraft is to be located in the airspace voxel, such as according to a schedule, flight plans, etc., or according to sensor data obtained from one or more aircraft. As another example, a voxel occupancy condition can include a quantity of aircraft to be located in the airspace voxel, can include one or more characteristics of aircraft to be located in the airspace voxel (e.g., size(s), weight(s), class(es), etc. of the aircraft), or the like.

In some implementations, an airspace parameter can represent one or more conditions that include one or more ground conditions. For example, a ground condition can relate to objects on the ground beneath an airspace voxel (e.g., fire trucks, ladders, cranes, people, etc.). Additionally, or alternatively, UAV management device 260 and/or source device(s) 270 can obtain information, identifying the ground conditions, from a database and/or from sensor data of an aircraft.

As further shown in FIG. 4, process 400 can include receiving one or more flight parameters regarding a potential flight plan of an aircraft through a plurality of airspace voxels, including the airspace voxel, during the particular time period (block 430). For example, UAV management device 260 can receive one or more flight parameters (e.g., from client device 280 via external network 250) regarding a potential flight plan of an aircraft through a plurality of airspace voxels, including the airspace voxel, during the particular time period.

In some implementations, a flight parameter can relate to a potential flight plan of an aircraft. In some implementations, a flight plan can include a departure location (e.g., ground beneath a first voxel), an arrival location (e.g., ground beneath a second voxel), and/or multiple departure locations and arrival locations (for multiple deliveries of packages, for example). Additionally, or alternatively, a flight plan can include voxels to be traversed by the aircraft, an order or sequence in which the voxels are to be traversed, an overall flight time, a flight time per voxel (e.g., an amount of time to spend in a voxel), an overall flight speed, a flight speed per voxel, and/or the like.

In some implementations, a flight parameter can include one or more aircraft parameters relating to characteristics of the aircraft. For example, a flight parameter can include a size, weight, or class of the aircraft (e.g., the aircraft for which a recommendation is to be generated). As another example, a flight parameter can include information that represents an airworthiness of the aircraft (e.g., due to maintenance, age, etc.). As yet another example, a flight parameter can include information that represents a payload of the aircraft (e.g., a type of payload, an indication of a value or a fragility of the payload, a weight of the payload, sensitivity level of payload, resolution of a camera on UAV 210, etc.). As still another example, a flight parameter can include information that represents an amount of noise generated by the aircraft (e.g., which can be taken into account for a noise ordinance).

In some implementations, a flight parameter can include one or more pilot parameters relating to characteristics of the pilot of the aircraft. For example, the pilot parameters can include information that indicates whether the pilot is registered to pilot UAVs in the voxel (e.g., as per local government regulations). As another example, the pilot parameters can include information that represents qualifications of the pilot, experience of the pilot (e.g., number of flights, number of years, etc.), a type of pilot's license that the pilot has, or the like.

In some implementations, a flight parameter can include one or more analysis parameters relating to a preference of an entity (e.g., owner, pilot, etc.) associated with the aircraft. For example, the analysis parameters can include information that represents a risk tolerance associated with the aircraft or the potential flight plan (e.g., low cost drones or payloads can have a higher risk tolerance for potential accidents than high cost drones or payloads). As another example, the analysis parameters can include information that represents a cost tolerance associated with the aircraft or the potential flight plan (e.g., certain flight plans can require more expensive pilots, can require more expensive licenses, etc.). As yet another example, the analysis parameters can include information that represents a time tolerance associated with the aircraft or the potential flight plan (e.g., the entity can have a total flight time requirement from departure to arrival). As yet another example, the analysis parameters can include information that represents a network tolerance associated with the aircraft or the potential flight plan (e.g., a system or network with infrastructure that supports flight operations can have thresholds associated with cost to the system or network, risk to the system or network, time factors associated with the system or network, etc.).

As further shown in FIG. 4, process 400 can include analyzing the one or more flight parameters and a plurality of airspace parameters, associated with the plurality of airspace voxels, using one or more airspace rules (block 440). For example, UAV management device 260 can analyze the one or more flight parameters and a plurality of airspace parameters, associated with the plurality of airspace voxels, using one or more airspace rules.

In some implementations, UAV management device 260 can use the airspace rules to analyze flight parameter(s) and airspace parameter(s) of airspace voxels associated with a potential flight plan. For example, the airspace rules can be global rules that apply to all aircraft (e.g., government regulations), individual UAV rules that apply to a particular UAV 210, group UAV rules that apply to a group of UAVs 210 (e.g., UAVs owned by the same owner, UAVs that are the same class, etc.), pilot rules that apply to a particular pilot or a particular type of pilot license, and/or the like.

In some implementations, UAV management device 260 can analyze a large quantity of flight plans, taking into account travel through different sequences of voxels from departure location to arrival location. In some cases, UAV management device 260 can apply one or more rules indicating that a UAV cannot traverse a same voxel more than once, can apply one or more rules indicating that a UAV can traverse a same voxel more than once (e.g., backtracking to avoid collision), and/or can apply one or more rules indicating that a UAV is to hover, adjust speed, and/or the like.

In some implementations, UAV management device 260 can generate scores for flight plans that take into account one or more of a risk factor (e.g., potential for collision or accident), a cost factor (e.g., energy consumption), a time factor (e.g., time of travel), a network factor (e.g., a risk, cost, or time factor to a network operator with infrastructure that support flight operations), and/or the like. In this case, UAV management device 260 can apply different weights to different factors based on preferences of an entity associated with aircraft. In some cases, UAV management device 260 can automatically accept a flight plan if the score satisfies a first threshold. Similarly, UAV management device 260 can automatically reject a flight plan if the score does not satisfy a second threshold.

In some cases, UAV management device 260 can calculate a voxel score for individual voxels, and can combine voxels along a flight path from a departure location to an arrival location (e.g., a summation of all voxels, an average voxel score, a maximum voxel score, etc.) to calculate an overall score for the flight path. In some implementations, if a score is between thresholds, UAV management device 260 can output the score and/or factors that contributed to the score, and can request operator input as to whether to accept the flight plan. In some implementations, UAV management device 260 can base scores, airspace rules, and/or recommendations not only on the aircraft for which the flight plan is being determined, but also on other aircraft expected to be in the voxels of the flight plan.

For some airspace rules, UAV management device 260 may not permit the rules to be violated, such as travel through restricted airspace. For some airspace rules, UAV management device 260 may not permit the rules to be violated for a particular entity, such as travel through a voxel with more than a threshold quantity of aircraft. For some airspace rules, UAV management device 260 may permit the rules to be violated in some situations, based on weighing a number of factors.

As an example of an airspace rule, UAV management device 260 can prevent flight through a voxel if the voxel is in restricted airspace, or can restrict flight to a certain class of aircraft (e.g., military). In this case, the restriction could be a permanent restriction or a temporary restriction. For example, UAV management device 260 can periodically pull information from a database that stores information regarding temporary restrictions.

As still another example of an airspace rule, UAV management device 260 can restrict takeoff and landing on ground beneath voxels based on zoning laws that define valid takeoff and landing zones. As another example of an airspace rule, UAV management device 260 can compare a noise level (e.g., in decibels) of aircraft to a noise level permitted by a noise ordinance associated with a particular voxel. In this case, UAV management device 260 can compare a noise level of individual aircraft, or can aggregate information for all aircraft expected to be in the particular voxel to determine whether an additional aircraft is permitted. If a noise ordinance is associated with ground beneath a voxel, UAV management device 260 can adjust the noise level based on the distance from the voxel to the ground.

As yet another example of an airspace rule, if aircraft payload includes a camera (e.g., for surveillance, mapping, etc.), UAV management device 260 can restrict flight in certain voxels based on privacy ordinances. In this case, UAV management device 260 can compare a resolution of the camera to a resolution permitted by a privacy ordinance to determine whether to permit flight through the voxel.

As still another example of an airspace rule, UAV management device 260 can allow or prevent flight through a voxel or modify a voxel score (e.g., a risk score) if wind speed satisfies a threshold, if an amount of rain, snow, sleet, hail, fog, clouds, lightning, sunlight, etc. in the voxel satisfies a threshold, if a temperature, humidity, barometric pressure, etc. satisfies a threshold (e.g., a temperature above a first threshold or below a second threshold, etc.), and/or the like.

As another example of an airspace rule, UAV management device 260 can allow or prevent flight through a voxel or modify a voxel score based on time of day. For example, there can be different conditions at different times of day, a flight can be safer during the day than at night because visibility is higher, or the like.

As yet another example of an airspace rule, UAV management device 260 can allow or prevent flight through a voxel or modify a voxel score based on voxel occupancy, such as based on whether another aircraft is to be located in the voxel, a quantity of aircraft to be located in the voxel, characteristics of one or more aircraft to be located in the voxel (e.g., size, class, weight, etc.), or the like.

As still another example of an airspace rule, UAV management device 260 can allow or prevent flight through a voxel or modify a voxel score based on a ground condition relating to an object on the ground beneath the voxel. For example, UAV management device 260 can prevent flight or higher risk if there is a crane on the ground beneath a voxel, if there are a threshold quantity of people on the ground beneath a voxel, or the like. In this case, the airspace rule can also be based on aircraft parameters (e.g., UAV management device 260 can prevent flying above people when the payload is heavy).

As another example of an airspace rule, UAV management device 260 can allow or prevent flight through a voxel or modify a voxel score based on characteristics of the aircraft. As a specific example, UAV management device 260 can permit a small aircraft to fly through a voxel if there are two other aircraft to be located in the voxel, while a large aircraft may not be permitted to fly through the voxel. As another specific example, a more airworthy aircraft can have a higher risk tolerance than a less airworthy aircraft, and UAV management device 260 can permit the more airworthy aircraft to fly through a voxel with a higher risk score (e.g., due to bad weather) than a less airworthy aircraft. As yet another specific example, an aircraft with a more fragile or valuable payload can have a lower risk tolerance than an aircraft with a less fragile or less valuable payload. Similarly, a more expensive aircraft can have a lower risk tolerance than a less expensive aircraft (e.g., because the more expensive aircraft will be more costly to replace in the event of an accident).

As yet another example of an airspace rule, UAV management device 260 can allow or prevent flight through a voxel or modify a voxel score based on characteristics of a pilot of UAV 210. For example, UAV management device 260 can permit a pilot with a higher score (e.g., due to more experience, a higher class of license, more qualifications, etc.) to fly a UAV through a voxel with a higher risk score as compared to a pilot with a lower score. As another example, UAV management device 260 can require a pilot to be licensed or registered with a government or municipality that controls the airspace voxel.

In some implementations, UAV management device 260 can perform the analysis to generate a binary score based on applying one or more airspace rules (e.g., indicating UAV 210 is permitted or not permitted to fly through voxel(s)). For example, the binary score can indicate UAV 210 is not permitted to fly through a voxel that is part of restricted airspace. Additionally, or alternatively, UAV management device 260 can perform the analysis to generate a non-binary score based on applying one or more airspace rules. For example, UAV management device 260 can generate a numeric score, a labeled score (e.g., green, yellow, red, or high, medium, low), and/or the like.

In some implementations, UAV management device 260 can generate one or more category scores, such as a risk score, a cost score, a time score, a network score, and/or the like. In some cases, UAV management device 260 can combine two or more category scores to generate an overall score (e.g., for a voxel or a group of voxels included in a flight plan). In this case, UAV management device 260 can apply weights to different category scores based on user input indicating the importance of the different categories.

As further shown in FIG. 4, process 400 can include outputting a recommendation regarding the potential flight plan based on analyzing the one or more flight parameters and the plurality of airspace parameters (block 450). For example, UAV management device 260 can output a recommendation (e.g., to client device 280 via external network 250) regarding the potential flight plan based on analyzing the one or more flight parameters and the plurality of airspace parameters.

In some implementations, UAV management device 260 can determine the recommendation based on the analysis described above, such as based on the binary score, non-binary score, or the like. In some cases, the recommendation can include automatic approval or rejection of a flight plan (e.g., based on a binary score and/or based on comparing a non-binary score to a threshold). In some cases, UAV management device 260 can transmit approval or rejection to UAV 210 (e.g., which can be located at a departure location, or can store a schedule of flight plans), and can be used by UAV 210 for a flight.

Additionally, or alternatively, UAV management device 260 can provide the recommendation to client device 280 of an entity associated with UAV 210 (e.g., pilot, owner, shipper, user, etc.). In some implementations, the recommendation can include a recommendation of whether to approve or reject a flight plan. In this case, the entity can interact with client device 280 to provide input on whether to approve or reject the recommendation, and can send that information to UAV management device 260. In some implementations, UAV management device 260 can use this user input as feedback for a machine learning algorithm, and can automate future decisions based on machine learning (e.g., for this entity, similar entities, and/or other entities).

In some implementations, the recommendation can include a recommended flight plan. In this case, UAV management device 260 can determine the flight plan based on a best overall score for the flight plan, and/or based on individual scores (e.g., a risk score, a cost score, a time score, a network score, etc.) for the flight plan (e.g., based on combining scores for voxels included in the flight plan).

In some implementations, the recommendation can include multiple flight plans with an option to select one (e.g., least risky vs. least costly vs. shortest flight time vs. least cost to the network, or some combination thereof, or top 3 scores with risk score, cost score, time score, network score, etc.). Additionally, or alternatively, UAV management device 260 can indicate reasons for the scores or potential risk factors (e.g., high wind, high occupancy, etc.). In some cases, UAV management device 260 can output one or more parameters associated with the voxels so that the user can see conditions along the flight plan.

In some cases, UAV management device 260 can provide the recommendation pre-flight, and can use the recommendation to schedule a flight of UAV 210. In some cases, UAV management device 260 can provide the recommendation in-flight. For example, UAV 210 can use sensors to detect a trigger condition (e.g., high occupancy, bad weather, etc.), and can request an update to a flight plan. In this case, UAV management device 260 can receive the request, can execute the analysis, and can return a recommendation to UAV 210 in flight (e.g., via a base station in communication with UAV 210).

Additionally, or alternatively, UAV management device 260 can monitor airspace by receiving real-time information regarding UAVs 210 (e.g., locations, characteristics, sensor data, payloads, maintenance records, etc.), weather, events, regulatory changes, etc., and can proactively send revised flight plans to UAVs 210. If approved, UAV management device 260 can update stored information. For example, UAV management device 260 can update voxel occupancy information that indicates a quantity and characteristics of aircraft to be located in the voxel.

Although FIG. 4 shows example blocks of process 400, in some implementations, process 400 can include additional blocks, fewer blocks, different blocks, or differently arranged blocks than those depicted in FIG. 4. Additionally, or alternatively, two or more of the blocks of process 400 can be performed in parallel.

Implementations described herein can divide airspace into airspace voxels that each represent a three-dimensional portion of airspace during a particular time period. This can result in the creation of thousands, millions, or more voxels. An airspace voxel can be associated with airspace parameters that represent conditions relating to flight through the airspace voxel during a particular time period. These airspace voxels and associated airspace parameters can be used to analyze and provide recommendations regarding flight plans for tens, hundreds, thousands, millions, or more UAVs to consistently generate safe, efficient flight plans. Such flight plans can be analyzed before a UAV flight, or can be generated in real-time via direct communication with the UAV while the UAV is in flight. In this way, a large quantity of UAV flight plans can be improved or optimized to increase flight safety, reduce accidents, conserve UAV energy (e.g., battery power, fuel, etc.), reduce flight time, and/or the like.

The foregoing disclosure provides illustration and description, but is not intended to be exhaustive or to limit the implementations to the precise form disclosed. Modifications and variations are possible in light of the above disclosure or can be acquired from practice of the implementations.

As used herein, the term component is intended to be broadly construed as hardware, firmware, or a combination of hardware and software.

Some implementations are described herein in connection with thresholds. As used herein, satisfying a threshold can refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein and/or shown in the figures. A user interface can include a graphical user interface, a non-graphical user interface, a text-based user interface, etc. A user interface can provide information for display. In some implementations, a user can interact with the information, such as by providing input via an input component of a device that provides the user interface for display. In some implementations, a user interface can be configurable by a device and/or a user (e.g., a user can change the size of the user interface, information provided via the user interface, a position of information provided via the user interface, etc.). Additionally, or alternatively, a user interface can be pre-configured to a standard configuration, a specific configuration based on a type of device on which the user interface is displayed, and/or a set of configurations based on capabilities and/or specifications associated with a device on which the user interface is displayed.

To the extent the aforementioned embodiments collect, store, or employ personal information provided by individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as may be appropriate for the situation and type of information. Storage and use of personal information can be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features can be combined in ways not specifically recited in the claims and/or disclosed in the specification. Although each dependent claim listed below can directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and can be used interchangeably with "one or more." Furthermore, as used herein, the term "set" is intended to include one or more items (e.g., related items, unrelated items, a combination of related and unrelated items, etc.), and can be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more memories; and
one or more processors, communicatively coupled to the one or more memories, to:
receive information that identifies an airspace voxel that represents a three-dimensional portion of airspace during a particular time period;
associate one or more airspace parameters with the airspace voxel,
the one or more airspace parameters representing one or more conditions that relate to flight through the airspace voxel during the particular time period;
receive one or more flight parameters regarding a potential flight plan of an aircraft through a plurality of airspace voxels, including the airspace voxel, during the particular time period,
where the aircraft is an unmanned aerial vehicle (UAV), and
where the one or more flight parameters include one or more analysis parameters,
the one or more analysis parameters including at least one of:
a risk tolerance associated with the UAV or the potential flight plan,
a cost tolerance associated with the UAV or the potential flight plan,
a time tolerance associated with the UAV or the potential flight plan, or
a network tolerance associated with the UAV or the potential flight plan;
analyze the one or more flight parameters and a plurality of airspace parameters, associated with the plurality of airspace voxels, using one or more airspace rules;
generate a plurality of category scores for the plurality of airspace voxels,
the plurality of category scores including:
a risk score,
a cost score,
a time score, and
a network score;
combine two or more category scores, of the plurality of category scores, to generate an overall score for the plurality of airspace voxels,
different weights being applied to the two or more category scores; and
output a recommendation regarding the potential flight plan based on the overall score for the plurality of airspace voxels.

2. The device of claim 1, where the potential flight plan is associated with a flight of the aircraft from a first location to a second location; and
where the recommendation includes a recommended flight plan from the first location to the second location.

3. The device of claim 2, where the recommended flight plan is determined based on at least one of:

a risk score determined based on analyzing the one or more flight parameters and the plurality of airspace parameters using the one or more airspace rules,
a cost score determined based on analyzing the one or more flight parameters and the plurality of airspace parameters using the one or more airspace rules,
a time score determined based on analyzing the one or more flight parameters and the plurality of airspace parameters using the one or more airspace rules,
a network score determined based on analyzing the one or more flight parameters and the plurality of airspace parameters using the one or more airspace rules.

4. The device of claim 1, where the recommendation includes at least one of:
a rejection of the potential flight plan,
an approval of the potential flight plan, or
a request for user input to reject or approve the potential flight plan.

5. The device of claim 1, where the one or more processors are to analyze the one or more flight parameters and the plurality of airspace parameters based on at least one of:
a pre-flight request received prior to takeoff of the aircraft, or
an in-flight request received during flight of the aircraft.

6. The device of claim 5, where the one or more flight parameters and the plurality of airspace parameters are based on an in-flight request received during flight of the aircraft,
wherein the in-flight request is received from the aircraft.

7. The device of claim 1, where the one or more processors are to:
receive information indicating that the one or more conditions that relate to flight through the airspace voxel have changed; and
alter the potential flight plan based on the information indicating that one or more conditions that relate to flight through the airspace voxel have changed.

8. A non-transitory computer-readable medium storing instructions, the instructions comprising:
one or more instructions that, when executed by one or more processors, cause the one or more processors to:
receive information that identifies an airspace voxel that represents a three-dimensional portion of airspace during a particular time period;
associate one or more airspace parameters with the airspace voxel,
the one or more airspace parameters representing one or more conditions that relate to flight through the airspace voxel during the particular time period;
receive one or more flight parameters regarding a potential flight plan of an aircraft through a plurality of airspace voxels, including the airspace voxel, during the particular time period,
where the aircraft is an unmanned aerial vehicle (UAV), and
where the one or more flight parameters include one or more analysis parameters,
the one or more analysis parameters including at least one of:
a risk tolerance associated with the UAV or the potential flight plan,
a cost tolerance associated with the UAV or the potential flight plan,
a time tolerance associated with the UAV or the potential flight plan, or
a network tolerance associated with the UAV or the potential flight plan;

analyze the one or more flight parameters and a plurality of airspace parameters, associated with the plurality of airspace voxels, using one or more airspace rules;
generate a plurality of category scores for the plurality of airspace voxels,
the plurality of category scores including:
a risk score,
a cost score,
a time score, and
a network score;
combine two or more category scores, of the plurality of category scores, to generate an overall score for the plurality of airspace voxels,
different weights being applied to the two or more category scores; and
output a recommendation regarding the potential flight plan based on the overall score associated with the plurality of airspace voxels.

9. The non-transitory computer-readable medium of claim 8, where the one or more conditions are one or more regulatory conditions regarding at least one of:
a flight restriction in the airspace voxel,
a zoning law associated with the airspace voxel,
a noise ordinance associated with the airspace voxel, or
a privacy ordinance associated with the airspace voxel.

10. The non-transitory computer-readable medium of claim 8, where the one or more conditions are one or more environmental conditions regarding at least one of:
weather in the airspace voxel during the particular time period,
an amount of sunlight in the airspace voxel during the particular time period, or
a time of day during the particular time period.

11. The non-transitory computer-readable medium of claim 8, where the one or more conditions are one or more voxel occupancy conditions regarding at least one of:
whether another aircraft is to be located in the airspace voxel during the particular time period,
a quantity of aircraft to be located in the airspace voxel during the particular time period, or
a size, weight, or class of one or more aircraft to be located in the airspace voxel during the particular time period.

12. The non-transitory computer-readable medium of claim 8, where the one or more conditions are one or more ground conditions regarding one or more objects located on ground beneath the airspace voxel during the particular time period.

13. The non-transitory computer-readable medium of claim 8, where the one or more flight parameters include at least one of:
a size, weight, or class of the aircraft,
an airworthiness of the aircraft,
a payload of the aircraft,
an amount of noise generated by the aircraft, or
information associated with a pilot of the aircraft.

14. A method, comprising:
receiving, by a device, information that identifies an airspace voxel that represents a three-dimensional portion of airspace during a particular time period;
associating, by the device, one or more airspace parameters with the airspace voxel,
the one or more airspace parameters representing one or more conditions that relate to flight through the airspace voxel during the particular time period;
receiving, by the device, one or more flight parameters regarding a potential flight plan of an aircraft through a plurality of airspace voxels, including the airspace voxel, during the particular time period,
where the aircraft is an unmanned aerial vehicle (UAV), and
where the one or more flight parameters include one or more analysis parameters,
the one or more analysis parameters including at least one of:
a risk tolerance associated with the UAV or the potential flight plan,
a cost tolerance associated with the UAV or the potential flight plan,
a time tolerance associated with the UAV or the potential flight plan, or
a network tolerance associated with the UAV or the potential flight plan;
analyzing, by the device, the one or more flight parameters and a plurality of airspace parameters, associated with the plurality of airspace voxels, using one or more airspace rules;
generating, by the device, a plurality of category scores for the plurality of airspace voxels,
the plurality of category scores including:
a risk score,
a cost score,
a time score, and
a network score;
combining, by the device, two or more category scores, of the plurality of category scores, to generate an overall score for the plurality of airspace voxels,
different weights being applied to the two or more category scores; and and
outputting, by the device, a recommendation regarding the potential flight plan based on the overall score associated with the plurality of airspace voxels.

15. The method of claim 14, where the potential flight plan is associated with a flight of the aircraft from a first location to a second location; and
where the recommendation includes a recommended flight plan from the first location to the second location.

16. The method of claim 15, where the recommended flight plan is determined based on at least one of:
a risk score determined based on analyzing the one or more flight parameters and the plurality of airspace parameters using the one or more airspace rules,
a cost score determined based on analyzing the one or more flight parameters and the plurality of airspace parameters using the one or more airspace rules,
a time score determined based on analyzing the one or more flight parameters and the plurality of airspace parameters using the one or more airspace rules, or
a network score determined based on analyzing the one or more flight parameters and the plurality of airspace parameters using the one or more airspace rules.

17. The method of claim 14, where the recommendation includes at least one of:
a rejection of the potential flight plan,
an approval of the potential flight plan, or
a request for user input to reject or approve the potential flight plan.

18. The method of claim 14, where the one or more conditions include at least one of:
a regulatory condition,
an environmental condition,
a voxel occupancy condition, or
a ground condition.

19. The method of claim 14, where the one or more flight parameters include at least one of:
   a size, weight, or class of the aircraft,
   an airworthiness of the aircraft,
   a payload of the aircraft,
   an amount of noise generated by the aircraft, or
   information associated with a pilot of the aircraft.

20. The method of claim 14, further comprising:
   receiving information indicating that the one or more conditions that relate to flight through the airspace voxel have changed; and
   altering the potential flight plan based on the information indicating that one or more conditions that relate to flight through the airspace voxel have changed.

* * * * *

UNITED STATES PATENT AND TRADEMARK OFFICE
CERTIFICATE OF CORRECTION

Page 1 of 1

PATENT NO. : 10,650,686 B2
APPLICATION NO. : 15/725012
DATED : May 12, 2020
INVENTOR(S) : Jonathan Evans et al.

It is certified that error appears in the above-identified patent and that said Letters Patent is hereby corrected as shown below:

On the Title Page

Item [72], should read as follows:
[72] Inventors: Jonathan Evans, Portland, OR (US);
Dana Maher, Portland, OR (US);
Tariq Rashid, Jacksonville, FL (US);
X, Portland, OR (US)

Signed and Sealed this
Twenty-third Day of June, 2020

Andrei Iancu
*Director of the United States Patent and Trademark Office*